United States Patent [19]
Humber

[11] Patent Number: 5,606,127
[45] Date of Patent: Feb. 25, 1997

[54] METHOD OF SETTING A DISPLAYABLE MACHINE FUNCTION OF A WHEEL BALANCING MACHINE AND CORRESPONDING WHEEL BALANCING MACHINE

[75] Inventor: Kurt Humber, Griesheim, Germany

[73] Assignee: Hofmann Werkstatt-Technik GmbH, Pfungstadt, Germany

[21] Appl. No.: 546,310

[22] Filed: Oct. 20, 1995

[30] Foreign Application Priority Data

Dec. 9, 1994 [DE] Germany ............... 44 43 963.6

[51] Int. Cl.⁶ ........................................... G01M 1/02
[52] U.S. Cl. ..................................... 73/462; 73/487
[58] Field of Search ..................... 73/462, 460, 66, 73/487; 74/573 R; 364/463

[56] References Cited

U.S. PATENT DOCUMENTS

| | | | |
|---|---|---|---|
| 3,741,016 | 6/1973 | Hofmann | 73/462 |
| 4,939,941 | 7/1990 | Cellucci | 73/462 |
| 5,156,049 | 10/1992 | Douglas | 73/462 |
| 5,377,542 | 1/1995 | MConnell | 73/462 |
| 5,447,064 | 9/1995 | Drechsler | 73/462 |
| 5,488,861 | 2/1996 | McConnell | 73/462 |
| 5,526,686 | 6/1996 | Fuchs | 73/462 |

*Primary Examiner*—Christine K. Oda
*Attorney, Agent, or Firm*—Cushman Darby & Cushman Intellectual Property Group of Pillsbury Madison & Sutro LLP

[57] ABSTRACT

In a method of setting a displayable machine function of a wheel balancing machine, machine functions stored in a function setting device are addressed and simultaneously displayed and identified at a display device by means of a movably mounted sensing member which senses dimensions of a wheel to be balanced.

3 Claims, 1 Drawing Sheet

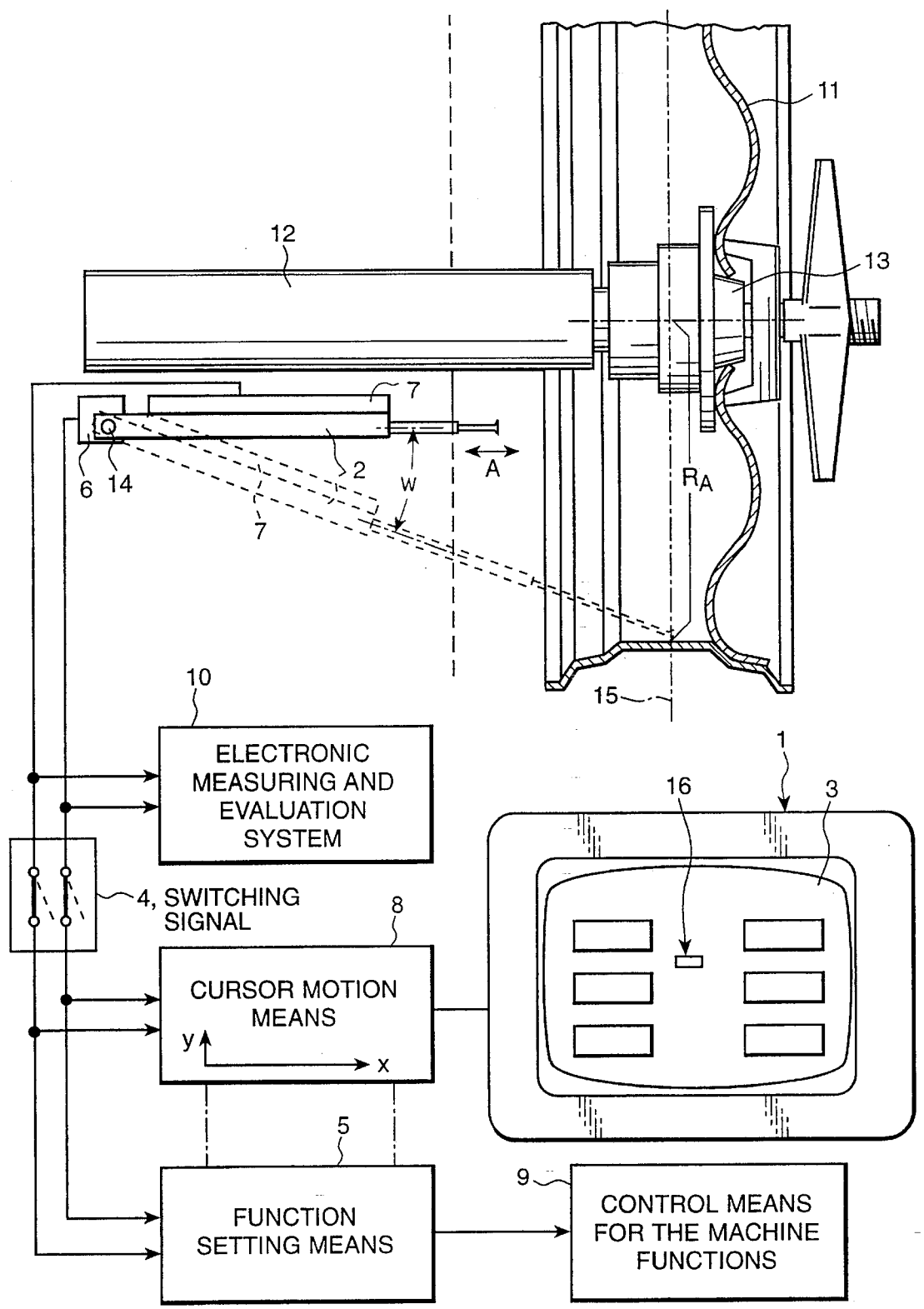

METHOD OF SETTING A DISPLAYABLE MACHINE FUNCTION OF A WHEEL BALANCING MACHINE AND CORRESPONDING WHEEL BALANCING MACHINE

BACKGROUND OF THE INVENTION

It is the practice in connection with wheel balancing machines for machine functions to be performed by the machine to be displayed on a display unit and suitably set in the machine by means of function keys. That mode of operation therefore requires an additional keyboard with various keys associated with the respective machine functions to be performed. The respectively set machine function can be displayed by means of the display unit on a display area or on a picture screen by being reproduced thereon.

SUMMARY OF THE INVENTION

An object of the present invention is to provide a method of setting a displayable machine function in a wheel balancing machine, such as to permit various functions of the wheel balancing machine to be set easily and reliably and without involving expensive and complicated structure.

Another object of the present invention is to provide a wheel balancing machine with which the various functions of the machine can be easily set in a simple reliable operating procedure without complications in structure of the machine and at reduced cost.

In accordance with the principles of the present invention the foregoing and other objects are achieved by a method of setting a displayable machine function of a wheel balancing machine, wherein the machine function is identified at a display unit and set by a sensing member which is mounted movably on the machine housing and with which dimensions of the wheel to be balanced can be appropriately sensed. Further in accordance with the invention, in the machine aspect thereof, the foregoing and other objects are attained by a wheel balancing machine comprising a machine housing with a sensing member arranged movably on the machine housing for sensing wheel dimensions of a wheel to be processed. A function setting means is provided for setting respective machine functions, and a display means is operable to display a set machine function. The display means at which certain machine functions can be reproduced and the function setting means are adapted to be connected to the sensing member in such a way that by virtue of the movement of the sensing member a displayed machine function can be set in the function setting means.

As will be noted from the following description of a preferred embodiment of the invention, the invention provides that a sensing member which is in any case provided on the wheel balancing machine and with which wheel dimensions of a wheel to be balanced can be sensed is used for setting a desired machine function which is displayed at the same time. In that respect, the movement of the sensing member relative to the housing of the machine is utilized for setting the respective machine functions. For that purpose, the machine can be so designed that the movement of the sensing member actuates a converter device which, in dependence on the movement of the sensing member, generates electrical signals which are passed to a function setting device in the electronic system of the machine for setting the required machine function. At the same time the electrical signals are sent to a display device at which the desired machine function is displayed. That can be effected by a procedure whereby the machine function to be set is individually displayed or the machine function to be set is identified by means of a cursor on a display surface of a picture screen on which a plurality of machine functions are designated in some suitable fashion as for example by means of pictographs or icons.

The sensing member for sensing wheel dimensions can serve to provide that suitable wheel dimensions such as the wheel radius and one or more balancing planes to which one or more balancing weights is or are to be fitted are sensed, for the electronic measuring system of the machine. In addition however the sensing member can also provide that by means thereof the balancing location at which a balancing weight is to be fixed to a wheel such as a motor vehicle disk wheel is ascertained, after a wheel-unbalance measuring run has been carried out, as described for example in U.S. Pat. No. 5,471,874.

The machine functions to be set in the machine, besides the step of sensing the wheel dimensions, may involve effecting an unbalance measuring run, a procedure for turning a wheel to be balanced into the appropriate angular position for balancing thereof, the balancing procedure itself, as well as start and stop of the respective machine functions, and the like.

The sensing member can perform various modes of movement which are utilized for setting the respective machine functions. For example, it is possible to make use of pivotability of the sensing member about a pivot point or an axis of rotation, for the purposes of producing appropriate signals for actuating the function setting device. In addition, where the sensing member is for example in the form of a telescopic sensing bar or rod member, it is possible to make use of signals which are generated in dependence on variations in the length of extension of the telescopic member. Where the sensing member is operable to move a cursor on the display surface of a reproduction or display unit, for example a picture screen, having a rectangular co-ordinate system, the rotary or pivotal movement of the sensing member and the telescopic movement of the sensing member can produce movements of the cursor on the display surface in the coordinate system in the X- and Y-directions. In that way the movement of the cursor for example in the X-direction and in the Y-direction and also for controlling a superimposed movement involving motions in both directions can be utilized, with simultaneous pivotal movement of the sensing member and a variation in the extension length thereof. The signals which are generated in that situation by a suitable converter means responsive to the movements of the sensing member are passed to a cursor motion control device operatively associated with the display unit.

In a preferred feature the machine may include a switching device with which it is possible either to connect different converter devices to the sensing member for measuring wheel dimensions and for setting the machine functions, or it is possible in each case to use the same converter device, in which case the electrical signals generated by the converter device are passed either to the electronic measuring and evaluation system of the machine when sensing the dimensions of a wheel to be balanced or to the function setting device and the display unit in the phase involving setting of the machine function.

Further objects, features and advantages of the present invention will be apparent from the following description of a preferred embodiment thereof.

BRIEF DESCRIPTION OF THE DRAWING

The single FIGURE of the accompanying drawing is a diagrammatic view of a wheel balancing machine showing necessary components thereof which are partly illustrated in a block circuit diagram.

DESCRIPTION OF THE PREFERRED EMBODIMENT

Referring to the FIGURE, reference numeral 11 therein denotes a disk wheel, for example a motor vehicle disk wheel, which is clamped fast in position on a rotary measuring spindle 12 of a wheel balancing machine by means of a suitable clamping arrangement indicated generally at 13. Reference numeral 2 denotes a sensing member which is illustrated in the form of a sensing rod or bar member. Dimensions of a wheel 11 clamped on the measuring spindle 12 can be measured by means of the sensing member 2, for example a radius $R_A$ for a balancing plane in which a balancing weight, for example an adhesive weight, is to be secured to the wheel 11 to provide for balancing thereof. The sensing member 2 can also be employed to measure the distance of a balancing plane as indicated at 15 from a reference point on the machine. To provide its sensing functions, the sensing member 2 is pivotable about a pivot point or rotary axis as indicated at 14, such pivotal or rotary movement being indicated by the double-headed arrow w, while the sensing member 2 is in the form of a telescopic rod or bar which is therefore variable in its length of extension, such variability being indicated by the double-headed arrow A.

The extension length of the sensing member 2 can be sensed by a measuring device 7 which is in the form of a converter which converts the measured length into a corresponding electrical signal. The machine further has a measuring converter 6 which senses the angle of pivotal movement of the sensing member 2 about the axis 14 and also converts that into a corresponding electrical signal. Those converter signals are fed to an electronic measuring and evaluation system 10 forming part of the machine and are evaluated in the appropriate manner in the procedure for calculating the balancing weight or weights to be fixed to the disk wheel 11 in the or each respective balancing plane 15.

In the case of the illustrated embodiment the electrical signals from the converters 6 and 7 can be passed by way of a switching device 4 to a function setting means 5 and at the same time employed to control a display unit 1. The switching device 4 is actuated by means of a switching signal which can be produced for example by a specific movement of the sensing member 2 or by a suitable control unit such as a foot-operated unit or a hand-operated button or key.

In the case of the illustrated embodiment the signals from the converters 6 and 7 are passed to the display unit 1 by way of a cursor motion means 8.

The cursor motion means 8 is operable to control the movement of a cursor 16 on a display surface 3 of the display unit 1. A number of machine functions can be represented on the display surface 3 in the form of pictographs or icons. The cursor 16 is moved by the cursor motion means 8 on the display surface 3 to the pictograph or icon representing the desired machine function.

Both the pivotal or rotary movement of the sensing member 2, which is sensed by the converter 6, and also the telescopic extension movement of the sensing member 2 which is sensed by the converter 7, can be utilized for controlling the movement of the cursor 16. In that respect for example the pivotal or rotary movement and the corresponding electrical signal generated by the converter 6 are evaluated for cursor movement in the Y-direction while the signal corresponding to the telescopic extension length of the sensing member 2, from the converter 7, is operable for movement in the X-direction. Both directions of movement can also be used in superimposed relationship for controlling the movement of the cursor 16.

At the same time, the same machine function as that which is identified by the cursor 16 on the display surface 3 is addressed in the function setting means 5 in which the machine functions are suitably stored. A signal corresponding to the set machine function is passed to a control means 9 for the machine functions so that the set function is then performed by the wheel balancing machine.

As is indicated by broken connecting lines in the FIGURE, the electrical signals from the converters 6 and 7 can also be passed by way of the cursor motion means 8 to the function setting means 5.

Instead of a display surface 3 on which a plurality of machine functions are represented simultaneously by pictographs or icons or by written identifications, it is also possible to use a smaller display surface on which the respective machine functions can be successively called up by the movement of the sensing member 2. A single mode of movement of the sensing member 2, for example pivotal or rotary movement thereof about the axis 14, may possibly be sufficient for that purpose, in which case then electrical converter signals are generated in dependence on the respective angles of pivotal or rotary movement, and those signals are used for successively calling up the respective machine functions on the display surface. The machine function which is identified and selected on the display surface is then also addressed in the function setting means 5 in which the machine functions are stored, and the control means 9 for the machine functions is then activated by an appropriate signal.

Various angular positions of the sensing member 2 about the axis 14 and/or various extension lengths of the sensing member 2 correspond to machine functions which are stored in the function setting means 5, for example in a storage means therein, and which are simultaneously displayed at the display surface 3 of the display unit 1. That configuration provides for the integration of additional functions into the actuation of the sensing member 2. In that way it is possible to save on an additional keyboard for setting the machine functions at the wheel balancing machine.

It will be appreciated that the above-described method and apparatus have been set forth solely by way of example and illustration of the principles of the present invention and that various modifications and alterations may be made therein without thereby departing from the spirit and scope of the invention.

What is claimed is:

1. A wheel balancing machine comprising a machine housing, a sensing member arranged movably on the machine housing for sensing wheel dimensions of a wheel to be balanced, a function setting means for setting respective machine functions, a display means for displaying a machine function, and connecting means adapted to connect the setting means and the display means to the sensing member in such a way that by virtue of the movement of the sensing member a displayed machine function can be set in the function setting means, wherein the connecting means include converter means operable in dependence on movement of the sensing member to generate electrical signals for the function setting means and the display means, and a switching means for connecting the converter means to the function setting means for setting to the displayed machine function.

2. A wheel balancing machine as set forth in claim 1 wherein the sensing member is operable to perform different modes of movement and said converter means is adapted to produce different electrical signals for identification at the display means of the machine function to be set.

3. A wheel balancing machine as set forth in claim 1 including means mounting said sensing member pivotably on said machine housing and means for linear variation of said sensing member in respect of its longitudinal extent, wherein said display means comprises a display surface having a rectangular co-ordinate system, and a cursor movable in the X- and Y-directions of the co-ordinate system, movements of the cursor in the X- and Y-directions in the co-ordinate system on the display surface being controllable by pivotal movement and extension and retraction movement of the sensing member.

* * * * *